United States Patent [19]
Lukosz

[11] Patent Number: 5,091,983
[45] Date of Patent: Feb. 25, 1992

[54] OPTICAL MODULATION APPARATUS AND MEASUREMENT METHOD

[76] Inventor: Walter Lukosz, Burstwiesenstr. 55, Greifensee 8606, Switzerland

[21] Appl. No.: 445,735
[22] PCT Filed: Jun. 4, 1987
[86] PCT No.: PCT/EP87/00289
§ 371 Date: Nov. 29, 1989
§ 102(e) Date: Nov. 29, 1989
[87] PCT Pub. No.: WO88/09917
PCT Pub. Date: Dec. 15, 1988
[51] Int. Cl.$^5$ .................. G02B 6/10; G01D 5/34
[52] U.S. Cl. ............................ 385/13; 385/30; 385/10; 385/14; 385/9; 385/37; 385/41; 250/231.19
[58] Field of Search ............ 350/96.11, 96.12, 96.13, 350/96.14, 96.15, 96.18, 96.19, 320; 250/231.19, 227.18, 227.19, 227.28; 372/96

[56] References Cited

U.S. PATENT DOCUMENTS

| | | | |
|---|---|---|---|
| 4,360,247 | 11/1982 | Beasley | 350/96.15 |
| 4,387,954 | 6/1983 | Beasley | 350/96.15 |
| 4,471,474 | 9/1984 | Fields | 350/96.15 |
| 4,545,253 | 10/1985 | Avicola | 250/227.11 X |
| 4,763,974 | 8/1988 | Thaniyavarn | 350/96.14 |
| 4,974,923 | 12/1990 | Colak et al. | 350/96.12 |
| 5,007,695 | 4/1991 | Chang | 350/96.14 |
| 5,016,958 | 5/1991 | Booth | 350/96.13 |
| 5,029,978 | 7/1991 | Curtis et al. | 350/96.29 |

FOREIGN PATENT DOCUMENTS 59-197829  11/1984  Japan ............ 350/96.15 X

*Primary Examiner*—Brian Healy
*Attorney, Agent, or Firm*—Walter C. Farley

[57] ABSTRACT

In an optical micromechanical method for changing the phase of guided waves and a measurement method for measuring very small mechanical displacements and/or mechanical forces or pressures, including the pressure of sound waves and ultrasonic waves, and/or accelerations, the distance d between a section (1') of an optical waveguide (1) in an integrated optic or fibre optic circuit and a phase-shifting element (5) separated from said section (1') by a gap (4) is varied by forces (6) or by thermal expansion due to changes in temperature. The phase of the guided wave (3) is thereby modulated, and reciprocally the changes in distance d and hence small mechanical displacements and the forces (6) which produce them are determined from the measured phase changes.

29 Claims, 5 Drawing Sheets

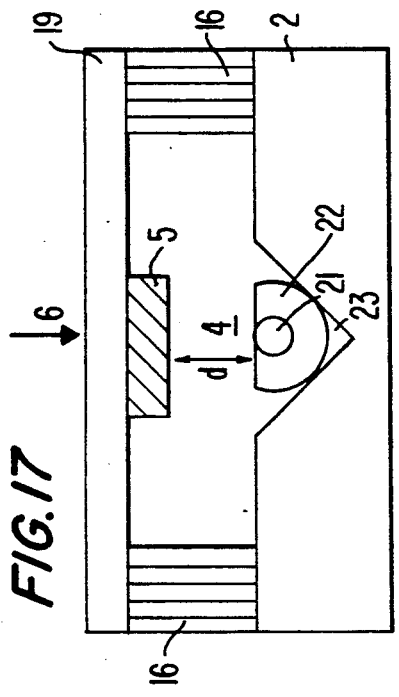
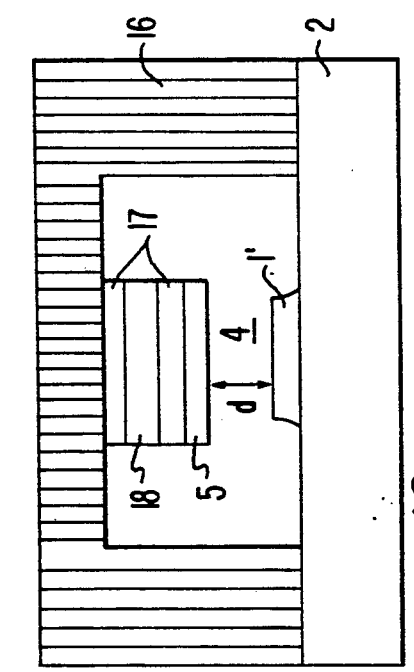
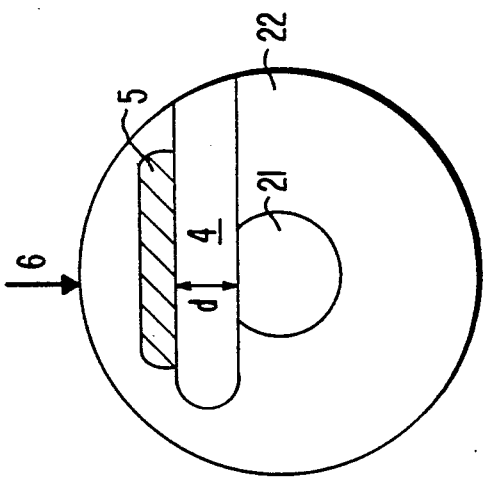
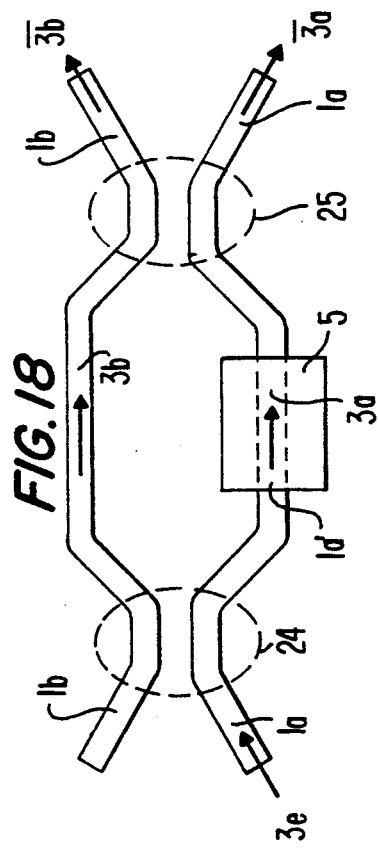

OPTICAL MODULATION APPARATUS AND MEASUREMENT METHOD

FIELD OF THE INVENTION

The present invention relates to an optical micromechanical method for changing the phase of guided waves and to a measurement method for very small mechanical displacements, an apparatus for performing the method according to the invention, and applications of the method for phase and/or intensity modulation, and/or for switching, and/or for deflection, and/or for focusing of optical waves, and/or for changing the resonance frequencies of frequency filters for guided optical waves, and/or for changing the emission frequencies of integrated optical lasers, and for measurement of mechanical forces, or pneumatic or hydrostatic pressures, including the pressures of sound and ultrasonic waves, and/or accelerations, and/or of electric voltages or currents, and/or of temperature changes.

BACKGROUND OF THE INVENTION

Optical waveguides have on the one hand the form of fiber waveguides. On the other hand they are the basic elements of integrated optics, where they are either planar waveguides or strip waveguides, that are arranged on a substrate or immediately under its surface. The waveguides have a higher refractive index than that of the substrate or the superstrate by which they are covered. Therefore the guidance of optical waves in the waveguide by total internal reflection is possible. Further integrated optical elements are, in particular, y-junctions, beam splitters and lenses for guided waves, moreover gratings acting as input or output couplers or as Bragg reflectors. In particular surface relief gratings are used which are located at the interface between substrate and waveguide or at the waveguide surface, or if the latter is covered with a superstrate, at the interface between waveguide and superstrate. With such integrated optical elements, integrated optic circuits are composed.

According to the prior state of the art in particular the following integrated optic circuits are known, which are used in the present invention: directional couplers, which consist of two strip waveguides that in a several millimeter long coupling region have a very small distance from each other and which, for example, are used for switching optical waves between two different output ports and as intensity modulators; X-switches, where two strip waveguides cross each other under a small intersection angle, and which are used for switching optical waves between the two output waveguides; two-beam interferometers, in particular Mach-Zehnder and Michelson interferometers, which, e.g., are used for intensity modulation of optical waves; resonators, in particular Fabry-Perot, ring, and DFB (i.e., distributed feedback) resonators, which, e.g., are used as frequency filters and laser resonators; Bragg reflectors, which, e.g., are used as frequency selective reflectors or deflectors and for mode conversion between modes of different polarization and/or mode number; input grating couplers, which are used for incoupling of an optical wave into a waveguide; output grating couplers, which are used for outcoupling of a guided wave out of a waveguide, whereby the outcoupled beam can be focused by an output coupler with curved grating lines and non-constant grating period.

With such integrated optic circuits active integrated optic devices which can perform time dependent operations, in particular phase and intensity modulation, switch on and switch off, switching between different output ports, or deflection of guided optical waves, tuning of resonance frequencies of frequency filters or of the frequency for which the Bragg reflection law at a grating is satisfied, and tuning of the resonance frequencies of resonators, are realized according to the prior state of the art by exploiting the electro-optic, or more seldomly, the photo-elastic or the magneto-optic effect in the waveguide material itself or in the adjacent regions of the substrate or superstrate. The linear electro-optic effect occurs only in crystals but not in isotropic materials. This law of physics leads to a disadvantage in the prior art in that the choice of materials for active integrated optic devices is very restricted. Presently mainly $LiNbO_3$ crystals and III-V semiconductor compounds are used. Since for fiber optic communication technology cheap intgrated optic circuits are required in large numbers, the use of other and cheaper materials would be very desirable.

SUMMARY OF THE INVENTION

An object of the present invention is to provide a micromechanical method for changing the phase of guided waves which does not make use of electro-optic, magneto-optic, or photo-elastic properties of materials, but exploits a micromechanical movement or deformation, and to provide an apparatus for performing the method, for the fabrication of said apparatus a much wider range of materials to choose from is available, as they do not have to posses the above mentioned properties.

Another object, reciprocal to the one mentioned above, is to provide an optical measurement method that permits measurement very small mechanical displacement with a resolution in the nm (nanometer) to sub-nm range, and thus also the forces causing these displacements, in particular mechanical forces or pneumatic and hydrostatic pressures, or accelerations, or sound and ultrasonic waves, or electrostatically, electromagnetically, or piezoelectrically generated forces, and hence also the electric currents or voltages, or temperature changes inducing said forces.

The basic idea of the method according to the present invention is to change the effective refractive index N of an optical wave guided in a waveguide and thus its phase, by varying the distance d between the waveguide and a phase-shifting element located opposite to said waveguide, for example by applying a force or by thermally induced expansion or deformation. The phase-shifting element whose composition will be described in detail below, has to be arranged in such a small distance from the waveguide, that the wave guided in the waveguide interacts with the phase-shifting element through its evanescent field which decreases exponentially with increasing distance from the waveguide; preferably the distance d has to be smaller than one to four penetration depths $\Delta z$, where $\Delta z$ is defined below. Since the phase velocity $v_P$ of a guided wave by virtue of the relation $v_P = c/N$ —in which c is the velocity of light in vacuum - is related to the effective refractive index N, a variation of the distance d induces a change of the phase velocity $v_P$. The changes in effective refractive index N occur only in that section of the waveguide opposite to which the phase-shifting element is located.

The effect of the phase-shifting element on the effective refractive index N has the following cause: The electromagnetic field of the wave guided in the waveguide reaches out of the waveguide into the gap between the wave guide and the phase-shifting element, as the so-called evanescent wave whose field strength decreases exponentially with increasing distance from the waveguide. The gap is filled with a medium which is not light absorbing at the used wavelength $\lambda$ and which has a refractive index n smaller than the effective refractive index N (n<N). The penetration depth $\Delta z$ of the evanescent field into the gap is $\Delta z = (\lambda/2\pi)(N^2-n^2)^{-\frac{1}{2}}$. In the example where n=1 and N≧1.5, we have $\Delta z \leq 0.14\lambda$, i.e., $\Delta z$ is much smaller than the wavelength $\lambda$. Only if the refractive index difference N−n is very small, $\Delta z$ can become larger than $\lambda$; e.g. for N≧1.5 and N−n≧0.005, the penetration depth is $\Delta z \leq 1.3\lambda$. If the phase-shifting element is placed at a distance d smaller than about one to four penetration depths $\Delta z$, the evanescent field penetrates into the phase-shifting element or at least into its surface layers facing the waveguide. This interaction of the evanescent field with the phase-shifting element has the effect that the effective refractive index N of the wave guided in the waveguide becomes dependent on the distance d. Surprisingly, we found that the change in effective refractive index N for a change in d is very large, so that distance changes $\Delta d$ of a few nm (nanometers) or even of a fraction of one nm produce effective refractive changes $\Delta N$ sufficiently large for integrated optical modulation method, i.e. for example $\Delta N = 1 \cdot 10^{-3}$.

The phase-shifting element or its top surface layer or layers facing the waveguide, respectively, consists of one of the following three groups of materials:

1) dielectric materials, for example $SiO_2$, glass or polymers, which are absorption-free or have low absorption at the used wavelength $\lambda$ and which have refractive indices $n_E$ that are smaller than the effective refractive index N of the guided wave,
2) one or more dielectric layers which are absorption-free or have low absorption at the used wavelength $\lambda$, one of them having a refractive index $n_E > N$, where these layers can also form a waveguide,
3) an absorbing material, preferably a metal layer, for example of Al or Ag.

In case 1) the phase-shifting element induces only a change in effective refractive index N but no attenuation of the guided wave by absorption or radiation.

In cases 2) and 3) besides a large change in effective refractive index N an attenuation of the guided wave can occur by radiation and/or absorption.

The phase change $\Delta\Phi$ which a guided wave experiences in a waveguide section opposite a phase-shifting element of length L is $\Delta\Phi = (2\pi/\lambda)L\Delta N$. For small distance changes $\Delta d$, the effective index change $\Delta N$ is proportional to $\Delta d$, i.e., we have $\Delta N = S\Delta d$, where $S = \Delta N/\Delta d$ is a constant. At a wavelength of $\lambda = 0.8$ $\mu m$ a phase shift of $\Delta\Phi = \pi$ is obtained, for example, with $\Delta N = 1 \cdot 10^{-3}$ if L=0.4 mm, and with $\Delta N = 2 \cdot 10^{-4}$ if L=2 mm; if the sensitivity constant S has the value $S = 1 \cdot 10^{-3}$ (nm$^{-1}$), then $\Delta\Phi = \pi$ is obtained with distance changes of $\Delta d = 1$ nm and $\Delta d = 2$Å, respectively.

The method according to the invention can be applied in integrated optical circuits, which are known as such, as for example, in interferometers for intensity modulation of optical waves, in directional couplers, Mach-Zehnder interferometers, X-switches for switching of optical waves between different output waveguides, in resonators and Bragg reflectors for changing their resonance and transmission frequencies, in input grating couplers for changing the incoupling efficiency, in output grating couplers for changing the outcoupling angle and of the focusing of the outcoupled beam, and in planar waveguides for deflection and focusing of guided waves. With the method according to the invention all processes known in the prior art for modulating, switching and deflection of optical waves can be realized with the same—as such known—integrated optic circuits, but without making use of electro-optic, magneto-optic, or photo-elastic effects. The reason for this is as follows: the principle of operation of integrated optic circuits known in the prior art can be understood in such a way, that only the effective refractive index changes or phase changes of the waves guided in these circuits play a role, but not by which physical effect the effective index changes are produced. Therefore, these circuits have the same function if in the method according to the present invention the effective index changes required for their functioning are not induced by the electro-optic effect but by changing the distances d between one or several phase-shifting elements and the oppositely located waveguide sections.

The effect which is exploited for producing the effective index changes $\Delta N$ and phase changes $\Delta\Phi$ is a micromechanical relative movement between waveguide and phase-shifting element which makes use of very small displacements, which can lie in the nm or sub-nm range. To obtain high sensitivities $S = \Delta N/\Delta d$ in the method according to the present invention, i.e., to be able to work with small distance changes $\Delta d$, the distance d between the phase-shifting element and the waveguide has to be smaller than four penetration depths $\Delta z$; at very small distances in the range between a few nanometers and about one penetration depth very high sensitivities result. The gap between the phase-shifting element and the waveguide has to be filled with a medium which absorbs no or only very little light and which has a refractive index n<N at the used wavelength $\lambda$, preferably it is filled with air or another gas, or with a compressible or deformable material that can be laterally pressed out of the gap, or it is evacuated.

In the method according to the present invention on the one hand by known forces or by temperature changes, through thermal expansion or deformations, known distance changes $\Delta d$ and thus desired phase changes $\Delta\Phi$ of a guided wave are produced and the phase change $\Delta\Phi$ is either directly exploited for phase modulation, or is used in an integrated optic circuit to effect an intensity modulation, and/or deflection, and/or switching on or off, or switching between different output ports, and/or frequency changes of optical waves, or on the other hand—reciprocally—from the phase—, intensity—, or frequency-changes of an optical wave unknown distance changes $\Delta d$, i.e., very small mechanical displacements with a resolution in the nm and sub-nm range, are determined, and from these the forces producing the distance changes are determined, in particular, mechanical forces or pneumatic or hydrostatic pressures, including the pressures of sound and ultrasonic waves, or electrical currents and voltages, or temperature changes.

The apparatus for performing the method according to the invention comprises a waveguide, or an integrated optic or fiber optic circuit including at least one waveguide, and at least one phase-shifting element, that is located opposite to a section of the waveguide at a distance d which is so small that the wave guided in the waveguide by means of its evanescent field interacts with the phase-shifting element, said distance being preferably smaller than four penetration depths $\Delta z$, but larger than the required distance variation $\Delta d$, said phase-shifting element being arranged so that very small distance changes $\Delta d$ in the range of a fraction of one nm to several 10 nm or up to a fraction of one penetration depth $\Delta z$ can be effected by small external forces. The forces are in particular mechanical forces or pneumatic or hydrostatic pressures, the periodic pressure changes in sound and ultrasonic waves, acceleration forces, piezo-electric, electrostatic, or electromagnetic forces, forces induced by temperature changes through thermal expansion or deformation, or forces induced by acoustical surface waves.

In the fabrication of the apparatus according to the invention, silicon wafers with grown $SiO_2$ layers as buffer layers with small refractive index can be used as cheap substrate material, on which, for example by CVD methods, waveguides of higher refractive index, preferably of $Si_3N_4$, can be fabricated. As further cheap substrate materials glasses can be used, on which waveguides can be fabricated by doping with Tl- or Ag-ions, or by application of glass-like layers by evaporation, sputtering, or dip coating (sol-gel process). Also polymers can be used as materials for substrates, waveguides, separation layer and buffer layers, and for phase-shifting elements.

To fabricate in large numbers the apparatus according to the present invention, which comprises waveguides and integrated optic circuits as well as phase-shifting elements, in particular silicon technology is well suited, which makes use of photolithography, coating processes, and chemical and dry etching processes. With this technology not only planar structures, but also precise and very reliable three-dimensional micromechanical devices can be fabricated (see, e.g., K. Petersen, "Silicon as a Mechanical Material",Proc. IEEE, Vol. 70, No.5, pp 420–457 (1982)). Silicon technology is not only suited for the production of waveguides and integrated optic circuits, but in particular for that of phase-shifting elements arranged at a small distance opposite a section of a waveguide, which elements can also be called micromechanical elements. These elements fabricated in such a way have very small dimensions and small masses, so that the small distance changes $\Delta d$ can be produced with small forces and/or very fast in the $\mu s$ to ns range.

Silicon technology has great advantages: Not only integrated electronic circuits but also light sensitive detectors and passive optical waveguides and integrated optic circuits, i.e., passive integrated optic components, can be integrated on one chip. Since the commonly used materials have no electro-optic properties, silicon technology according to the prior art has the disadvantage that no active integrated optic devices as, e.g., modulators and switches can be fabricated. The present invention helps to overcome the last mentioned disadvantage.

In fiber optics, mainly glass fibers but also polymer fibers are employed as cylindrical optical waveguides. They consist of a core of higher refractive index $n_K$ and a cladding of lower refractive index $n_M < n_K$. The guided optical wave is guided in the core—similar as in integrated optics in planar or strip waveguides. The electromagnetic field of the guided wave reaches out into the cladding in the form of an evanescent wave with a field strength which decreases exponentially with increasing distance from the core. The thickness of the cladding is chosen many times larger than the penetration depth $\Delta z_M$ of the evanescent field into the cladding, to prevent any undesired influence on the guided mode from outside. If, in a waveguide section of length L, the cladding is either completely removed, or partially removed to a thickness of less than a few penetration depths $\Delta z_M$, the evanescent field reaches out of the core through the rest of the cladding into the outside. The removal of the cladding can according to prior art for example for glass fibers be achieved by polishing. With fiber waveguides according to the prior art passive fiber optic circuits can be built, for example, Mach-Zehnder, Michelson, and Sagnac interferometers, or Fabry-Perot and ring resonators. The mode of operation of the fiber optic circuits is analogous to that of the corresponding integrated optic circuits. These fiber optic circuits are employed for example in fiber optic sensor technology.

In the method according to the present invention the phase-shifting element is arranged opposite to that section of the fiber waveguide where the cladding has been completely or partially removed. Then the evanescent field of the wave guided in the fiber core reaches out into the gap between the fiber and the phase-shifting element and interacts with said element. The mode of operation of the method according to the present invention is in principle the same for fiber waveguides and strip waveguides. Therefore in the method according to the present invention for changing the phase of guided waves and the measurement method for very small mechanical displacements also fiber waveguides can be used. The method according to the present invention can therefore not only be used in integrated optic circuits but also in fiber optic circuits, for example, in an interferometer, as the Mach-Zehnder interferometer, for intensity modulation and for switching of guided waves between the output port waveguides.

BRIEF DESCRIPTION OF THE DRAWINGS

The invention is described below, by way of examples in the appended drawings. The figures of the drawings show.

DESCRIPTION OF THE PREFERRED EMBODIMENTS

Figure 1:
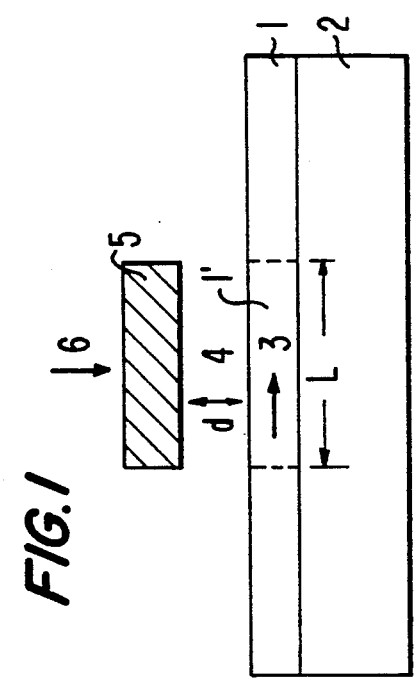
FIG. 1 a schematic longitudinal sectional view through the basic elements of the apparatus according to the invention with a phase-shifting element above a section of a waveguide, FIG. 2 a schematic longitudinal sectional view through an apparatus according to the invention with a phase-shifting element beneath a section of a waveguide, FIG. 3 a schematic top view of an apparatus in accordance with the invention with a phase-shifting element in one leg of a Mach-Zehnder interferometer, FIG. 4 a schematic top view of an apparatus in accordance with the invention with a directional coupler and a phase-shifting element in the coupling region, FIG. 5 a schematic top view of an apparatus in accordance the invention with a phase-shifting element above a grating acting as a Bragg reflector, FIG. 6 a schematic longitudinal sectional view of an apparatus in accordance the invention with a phase-shifting element inside a Fabry-Perot resonator, FIG. 7 a schematic longitudinal sectional view of an apparatus in accordance the invention with a phase-shifting element above a grating acting as an input coupler, FIG. 8 a schematic longitudinal sectional view of an apparatus in accordance the invention with a phase-shifting element above a grating acting as an output coupler, FIG. 9 a schematic top view of an apparatus in accordance the invention with a phase-shifting element with a wedge like gap above a planar waveguide for deflection of a guided wave, FIG. 10 a schematic perspective representation of an apparatus in accordance with the invention with a focusing output coupler grating and a phase-shifting element for deflection of the outcoupled beam, FIG. 11 a schematic top view of an apparatus in accordance the invention with a phase-shifting element above a X-switch, FIG. 12 a schematic cross-sectional view of an apparatus in accordance with the invention with a phase-shifting element attached to a tongue or paddle, FIG. 13 a sohematio longitudinal sectional view of an apparatus in accordance with the invention with a phase-shifting element and a waveguide with a protection layer containing a cavity, FIG. 14 a schematic longitudinal sectional view of an apparatus in accordance with the invention with a phase-shifting element and a waveguide with a protection layer and a cavity in the waveguide itself, FIG. 15 a schematic longitudinal sectional view of an apparatus in accordance with the invention with a cavity inside the waveguide, FIG. 16 a schematic cross-sectional view an apparatus in accordance with the invention with a phase-shifting element and a piezoelectric element for changing the distance d, FIG. 17 a schematic cross-sectional view of an apparatus in accordance with the invention with a phase-shifting element above a fiber waveguide, FIG. 18 a schematic top view of an apparatus in accordance with the invention with a phase-shifting element in one leg of a fiber optic Mach-Zehnder interferometer, FIG. 19 a schematic cross-sectional view of an apparatus in accordance with the invention with a fiber waveguide containing a cavity.

FIG. 1 shows the basic elements of the invention in schematic representation. Above a section 1' of length L of a waveguide 1 on a substrate 2, a phase-shifting element 5 is arranged. The attachment of the phase-shifting elements 5 to the waveguide 1 or the substrate 2 is not represented. The distance d between the waveguide section 1' and the phase-shifting element 5 is variable and changes with the magnitude of the force 6. An optical wave 3 guided in section 1' of the waveguide 1 has an effective refractive index N which depends on the distance d. With a change $\Delta d$ of the distance d the effective refractive index N is changed by $\Delta N$. The phase difference $\Phi$ which the guided wave 3 acquires during its propagation under the phase-shifting element 5 in the waveguide section 1' of length L is changed by $\Delta\Phi=2(L/\lambda)\Delta N$. A time dependent change $\Delta d(t)$ of the distance d causes a phase modulation $\Delta\Phi(t)$ of the guided wave 3. FIG. 1 is therefore also a schematic representation of an apparatus according to the present invention working as a phase modulator. Reciprocally, from a measured phase change $\Delta\Phi$ the change in distance $\Delta d$ can be determined and from this the force 6.

Figure 2:
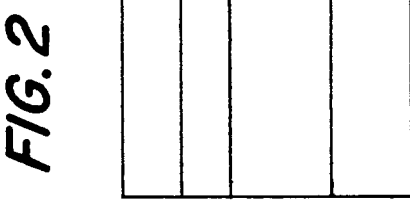

FIG. 2 shows as FIG. 1 the basic elements of the invention, but in a different arrangement of the phase-shifting element 5 beneath a section 1' of the waveguide 1. Between the waveguide 1 and the substrate 2 a buffer layer 7 can be provided. Beneath the waveguide section 1' a cavity is provided in the layer 7, or if the latter is not present, in the substrate 2, said cavity acts as the gap 4 and defines the distance d between the waveguide section 1' and the phase-shifting element 5. The phase-shifting element 5 can also be the region of the buffer layer 7 or of the substrate 2 that is directly adjacent to the gap 4. The waveguide can be covered with a protective layer 10, which must have a refractive index smaller than that of the waveguide 1 and which prevents an undesirable influence on the guided wave from outside. For example, the substrate 2 can consist of silicon (Si), the waveguide 1 of $Si_3N_4$, and the buffer layer 7, protection layer 10, and the phase-shifting element 5 of $SiO_2$ The distance d between the waveguide 1' and the phase-shifting element 5 changes with the magnitude of the force 6. Therefore, FIG. 2 is the schematic representation of an apparatus according to the present invention which, like that in FIG. 1, can be used on the one hand as a phase-modulator and on the other hand for measuring the distance change $\Delta d$ and thus the force 6.

Figure 3:
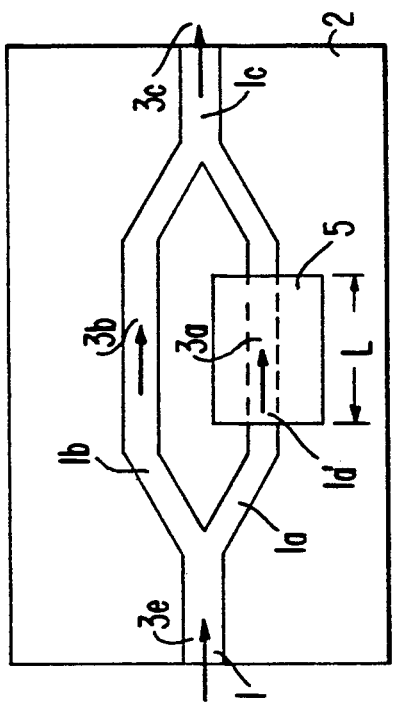

In FIG. 3 the process according to the present invention with a Mach-Zehnder interferometer as an integrated optic circuit is schematically represented. The strip waveguide 1 on the substrate branches out into the strip section waveguides 1a and 1b, which then reunite to form the strip waveguide 1c. A phase-shifting element 5 is arranged above a section 1a' of length L of the waveguide 1a. The distance d between the phase-shifting element 5 and the waveguide section 1a' is not shown in this top view. A guided wave 3e incident onto the interferometer is split up into the partial waves 3a and 3b. The interference of the two partial waves with a phase difference $\Phi_a-\Phi_b$ produces at the output port of the interferometer in waveguide 1c the guided wave 3c, the intensity of which is proportional to $\cos^2[(\Phi_a-\Phi_b)/2]$. By a distance change $\Delta d$ the effective refractive index of the guided wave 3a in waveguide section 1a, is changed by $\Delta N$, and its phase and hence also the phase difference $\Phi_a-\Phi_b$ are changed by $\Delta\Phi=2\pi(L/\lambda)\Delta N$. A distance change $\Delta d(t)$ causes a change in intensity of the guided wave 3c. With a time dependent force 6 through the resulting time dependent distance changes $\Delta d(t)$, an intensity modulation of the optical wave 3c is effected. Reciprocally, from measured intensity changes of wave 3c the distance change $\Delta d$, and from this the force 6 can he determined. With a further phase-shifting element (not shown) in the other leg of the interferometer, i.e. above the waveguide 1b, a phase change can also be imparted to the partial wave 3b; for example, by periodic distance changes of frequency $\Omega$, the frequency of wave 3b is changed by $\Omega$, in order to measure very precisely in a heterodyne process the force 6 exerted on the phase-shifting element 5 in leg 1a of the interferometer.

Figure 4:
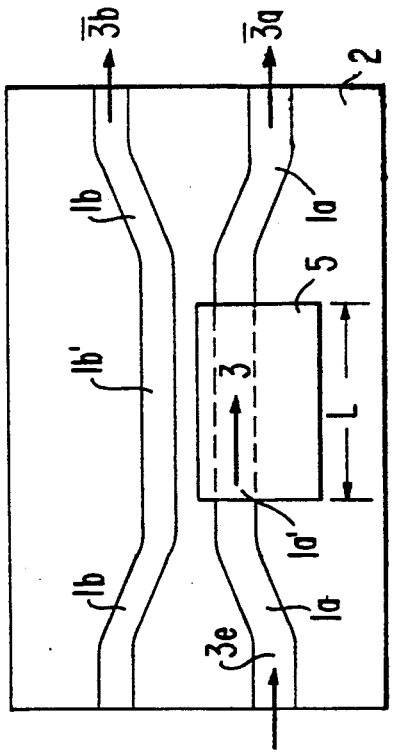

In FIG. 4 the method according to the present invention with a directional coupler as an integrated optic circuit is schematically represented. The strip waveguides 1a and 1b on a substrate 2, which in the coupling region have a small distance of typically 5-10 $\mu m$ from each other, form a directional coupler. For suitable lengths of the coupling region, typically 10 mm, and a suitable distance between the strip waveguides in the coupling region from each other, a guided wave 3e coupled into the waveguide 1a is coupled completely over into the waveguide 1b and appears at the output ports of the directional coupler in waveguide 1b as the guided wave 3b. By changing the effective refractive indices N in one or both of the strip waveguides 1a and 1b in the coupling region the wave 3e can be switched to the output port 1a, or formulated differently, the directional coupler is a 2×2 switch matrix, which can be switched from the parallel state to the cross state. The mode of operation of the directional coupler has been described in the literature for electro-optically induced changes of the effective refractive indices; see e. g., R. G. Hunsperger, "Integrated Optics: Theory and Technology", Chaps. 7 and 8, Springer Verlag, Berlin, 1982 and the literature cited therein. In the method according to the present invention a phase-shifting element 5 of length L is located at distance d opposite to the section 1a' of the waveguide 1a in the coupling region. By not represented forces 6 the distance d is changed and thus the effective refractive index N of the guided wave 3a in waveguide section 1a' is changed by $\Delta N$. Thus the coupling between the waveguides 1a and 1b is influenced; by a phase change of $\Delta\Phi = 2\pi(L/\lambda)\Delta N = \lambda/3$ for example, the directional coupler is switched from the cross state to the parallel state.

Not represented is the possibility, to arrange a second phase-shifting element above a section of the waveguide 1b' in the coupling region, in order to change the effective refractive indices in the two waveguides 1a' and 1b' independently of each other. A further possibility consists in working with a phase-shifting element 5 located in the coupling region above both waveguides 1a' and 1b', and by an increase of the distance from the one waveguide and a decrease of the distance to the other waveguide to produce a positive and a negative effective refractive index change, respectively, in the waveguides 1a' and 1b'.

In the case of the so-called "$\Delta\beta$-reversal coupler" according to the prior art the coupling region is divided up into two subsections, in which effective refractive index changes of different signs are produced electro-optically (see Hunsperger, loc. cit.). With the method according to the present invention, with two phase-shifting elements 5 above the two subsections into which the waveguide sections 1a' and 1b' are divided up, without the use of electro-optic materials the same effect is obtained as in the case of the $\Delta\beta$-reversal coupler. With the method according to the present invention with the directional coupler as the integrated optic circuit with a known time dependent distance change $\Delta d(t)$ also a desired intensity modulation of the guided waves $\overline{3a}$ or $\overline{3b}$ can be effected, or reciprocally from measured intensity changes of the waves $\overline{3a}$ or $\overline{3b}$ the unknown distance changes $\Delta d$ and the forces 6 can be determined. Not represented is the further possibility, to arrange arrays of directional couplers in an M×M' switch matrix (which is as such known in the prior art) and with the method according to the present invention with at least one phase-shifting element above each directional coupler, to interconnect each of the optical waves coming in on M input port waveguides with any desired of the M' output port waveguides, where M and M' are integers > 2, preferably powers of 2, for example 4, 16, or 128.

Figure 5:
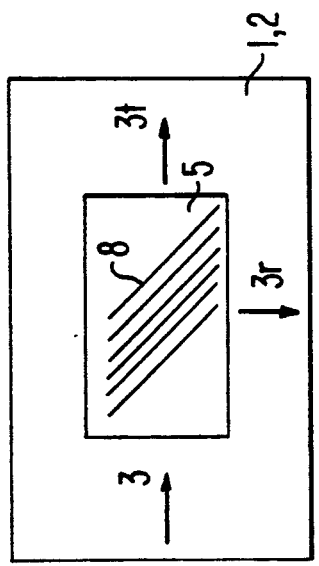

In FIG. 5 the method according to the present invention with a Bragg reflector as an integrated optic circuit is schematically represented. A grating 8 provided at the waveguide 1 on the substrate 2 acts as a Bragg reflector. A guided wave 3 is incident onto the Bragg reflector 8. By a force 6 (not shown) this distance d (likewise not shown in the top view) between the waveguide 1 and the phase-shifting element 5 located above the grating 8 is changed, and thereby a change in the effective refractive index in waveguide 1 in the region of the grating 8 is induced. Thereby the reflectance and transmittance of the Bragg reflector 8 are changed, and hence the amplitudes of the reflected and transmitted waves 3r and 3t. The Bragg condition for reflection of a monochromatic guided wave 3 of wavelength $\lambda$ reads: $2N\Lambda\sin\Theta = l\lambda$, where $\Lambda$ is the grating period, $\Theta$ the angle between the direction of the incident guided wave 3 and the lines of the grating, and $l = 1,2,...$ is the diffraction order. In the special case where the angle is $\Theta = 90°$, the guided wave 3 is retroreflected, if the Bragg condition $2N\Lambda = l\lambda$ is satisfied. By a distance change $\Delta d$ an effective refractive index change $\Delta N$ is induced in the region of the grating 8; this index change causes a change $\Delta\lambda$ of the wavelength $\lambda$, at which the Bragg reflection occurs at constant angle $\Theta$, whereby from the Bragg condition it follows that $\Delta\lambda/\lambda = \Delta N/N$. The waveguide 1 is represented as a planar waveguide; however also strip waveguides can be employed for the incident, transmitted, and reflected waves. In the case of a waveguide 1 having optical gain in the region of the grating 8, i.e., if waveguide 1 with grating 8 form a distributed feedback (DFB) laser with emissions wavelengths $\lambda$ given by the Bragg condition $2N\Lambda = l\lambda$ with $l = 1,2,...$, a distance change $\Delta d$ induces an effective refractive index change $\Delta N$ which in turn causes a change of the emission wavelength by $\Delta\lambda = \lambda(\Delta N/N)$. For certain angles of incidence $\Theta$ of an incident wave 3 on grating 8, Bragg reflection with mode conversion can occur, i.e., the reflected guided wave 3r differs from the incident wave 3 in polarization and/or mode number. If the distance d is varied, the amplitude of the Bragg reflected wave, i.e., the conversion efficiency is changed. Not shown is the possibility that the Bragg reflector consists of a surface relief grating which is located on the surface or surface layers 13 of the phase-shifting element 5.

Figure 6:
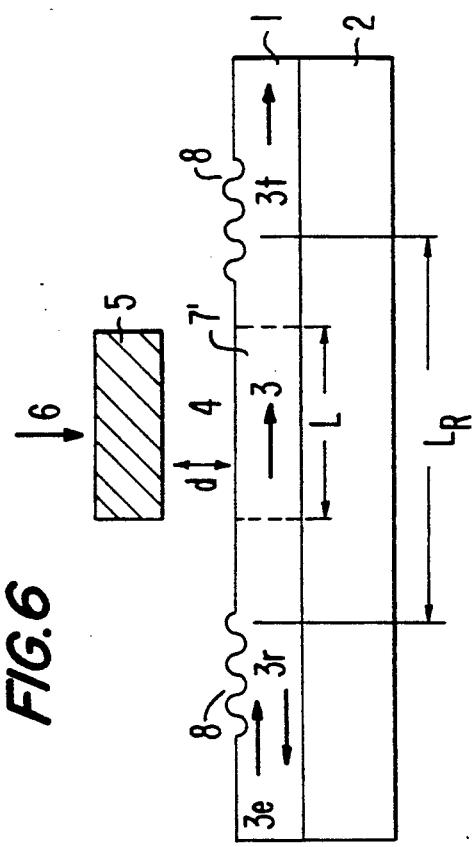

In FIG. 6 the method according to the present invention with a resonator as an integrated optic circuit is schematically represented. A phase-shifting element 5 is arranged at a distance d opposite section 1' of length L of the waveguide 1 inside of an integrated optic resonator. The resonator is represented as a Fabry-Perot interferometer or resonator of length $L_R$ with gratings 8 acting as partially transmitting mirrors. The resonance frequencies of the resonator are well known to coincide with the frequencies for which the transmittance of the interferometer has its maxima; they are denoted by $\nu_R$ and the corresponding resonance wavelengths by $\lambda_R$. In the case of a distance change $\Delta d$ induced by a force 6, an effective refractive index change $\Delta N$ occurs in the waveguide section 1'. Thereby the resonance wavelengths $\lambda R$ are shifted by $\Delta\lambda R$, where $2\Delta NL = l\Delta\lambda_R$ with $l = 1,2,...$, and $\Delta\lambda_R/\lambda_R = \Delta\nu_R/\nu_R = (\Delta N/N)(L/L_R)$. With a force 6 exerted on the phase-shifting element 5, the resonance frequencies of the resonator can be tuned or varied. This means that 1.) the resonator is a tunable frequency filter for an incident guided wave 3e,
2.) for a monochromatic incident guided wave 3e intensity changes of the transmitted wave 3r and the reflected wave 3t occur, and 3.) for a laser resonator with gain the emission wavelengths are tuned or varied.

Not represented is the possibility that the resonator is a ring resonator.

Figure 7:
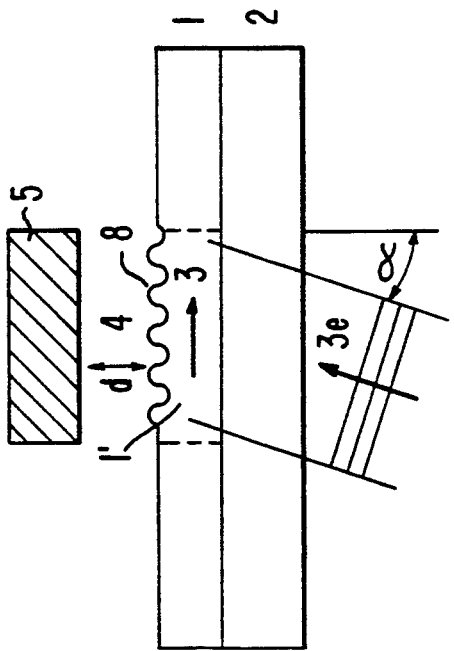

In FIG. 7 the method according to the present invention with a grating input coupler as integrated optic circuit is schematically represented. In this embodiment the distance d between the section 1' of an optical waveguide 1 on a substrate 2 provided with an input grating coupler 8 and the phase-shifting element 5 located above said grating 8 is varied by the influence of a force 6, and thus the incoupling efficiency $\eta$ with which an optical wave 3e, preferably a laser beam, incident under the angle of incidence $\alpha$ on the grating coupler 8, is coupled into the waveguide 1 as a guided wave 3, is changed. The incoupling efficiency $\eta$ is defined as the ratio of the powers of the incoupled guided wave 3 and of the incident wave 3e, respectively. By variation of the force 6 the power of the incoupled wave 3 and hence also that of the not incoupled part of the incident wave are changed. The condition for optimum incoupling, i.e. for maximum efficiency $\eta$, reads: $N = n\sin\alpha + l\lambda/\Lambda$, where N is the effective refractive index in the region of the grating coupler, n the refractive index of air, $\Lambda$ the grating period, and $l = 1,2,...$ is the diffraction order. In the case of an effective refractive index change $\Delta N$ induced by a distance change $\Delta d$, the incoupling efficiency $\eta$ is changed at constant angle of incidence $\alpha$. In the case where the incident wave is not monochromatic, the wavelength $\lambda$ which is optimally coupled in is shifted by $\Delta\lambda$; from the incoupling condition it follows that $\Delta N = l\Delta\lambda/\Lambda$. Not represented is, that the incident wave 3e can also impinge through the phase-shifting element 5—if the latter is transparent—onto the grating coupler 8. Also not represented is the possibility, that the grating coupler 8 consists of a surface relief grating which is located on the surface or the surface layers 13 of the phase-shifting element 5 facing the waveguide 1.

Figure 8:
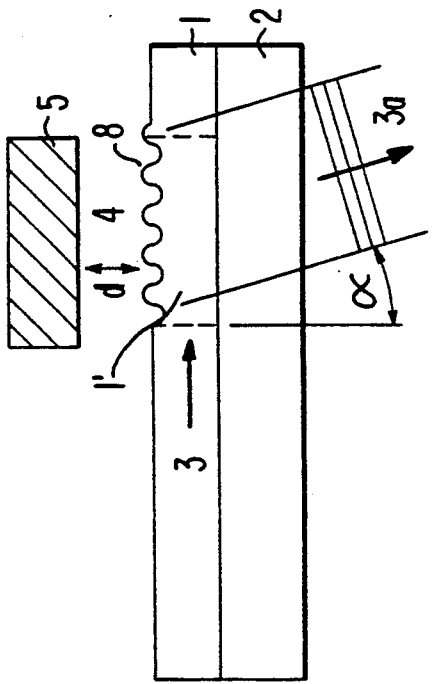

In FIG. 8 the method according to the present invention with a grating output coupler as integrated optic circuit is schematically represented. It consists in changing the distance d between the section 1' of a waveguide 1 on a substrate 2 which is provided with an output coupler grating 8 and the phase-shifting element 5 located above said grating 8, i.e. above the waveguide section 1', by exerting a force 6, and that thus the angle $\alpha$ is changed under which a guided wave 3 is outcoupled by the grating coupler 8. Being analogous to the incoupling condition, the equation for the outcoupling angle $\alpha$ of the outcoupled wave 3a reads: $N = n\sin\alpha + l\lambda/\Lambda$. An effective refractive index change $\Delta N$ in the region of the grating 8 leads to a change $\Delta\alpha$ of the outcoupling angle, where $\Delta N = n\Delta\alpha\cos\alpha$. If the guided wave 3 is not monochromatic, as assumed above, the wavelength $\lambda$ which is outcoupled under a given angle $\alpha$ is shifted by $\Delta\lambda$, where $\Delta N = l\Delta\lambda/\Lambda$. Not shown is, that the guided wave 3 by the grating coupler 8 can also be outcoupled in direction of the phaseshifting element 5 and—if the latter is transparent—can be radiated through it.

In the case where in the method according to the present invention the distance d(x) in direction of propagation x of the guided wave is formed like a wedge, the outcoupled wave 3a is focused or defocused. A linear change in the effectiven refractive index in the region of the grating coupler 8, i.e. $N(x) = N + (dN/dx)x$, where $dN/dx$ is a constant proportional to the wedge angle, has an effect analogous to that of a cylindrical lens of focal length $f = (dN/dx)^{-1}$ which is inserted into the path of the outcoupled wave 3a; for example we have $f = 1$ m, if N varies over a length of 5 mm by $\Delta N = 5 \cdot 10^{-3}$. The grating coupler 8 is shown as a grating with constant, i.e., not spatially varying grating period. But it can also have a spatially varying grating period and hence a focusing effect on the outcoupled wave 3a corresponding to that of a lens of focal length $f_o$. In this case with a change of the wedge angle of the phase-shifting element 5 the position of the focus of the outcoupled wave 3a is changed, namely by the distance $f_o^2/f$, for example by $f_o^2/f = 1$ mm if $f_o = 10$ mm and $f = 1$ m. Not shown is the further possibility that the grating coupler 8 consists of a surface relief grating which is located on the surface or surface layers 13 of the phase-shifting element 5.

Figure 9:
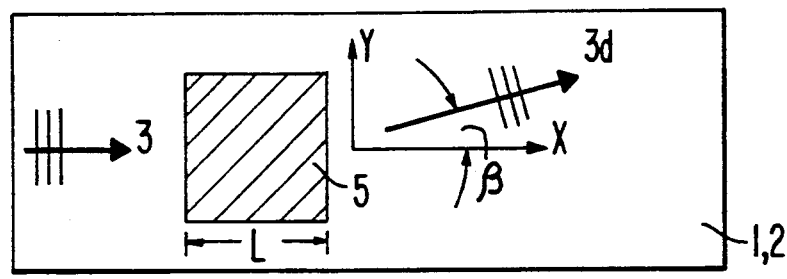

In FIG. 9 the method according to the present invention for laterally deflecting a guided wave in a planar waveguide is schematically represented. It consists in guiding a wave 3 in a planar waveguide 1 on a substrate 2, and in giving the gap 4 (which is not shown in the top view) between the section 1' of the waveguide 1 and the phase-shifting element 5 located opposite said section 1' a wedge like form in the y-direction (which is perpendicular to the x direction of propagation of the wave 3), and varying the wedge angle by applying not shown forces 6, whereby the angle $\beta$ by which the deflected guided wave 3d (after the phase-shifting element 5) is deflected from the direction of the incident guided wave 3, is changed. The wedge like gap 4, i.e. the distance d(y) which depends linearly on y, has the effect that the effective refractive index N of the guided wave 3 also depends linearly on y, i.e., we have $N(y) = N + (dN/dy)y$, where $dN/dy$ is a constant proportional to the wedge angle. Thereby the guided wave 3 during its propagation under the phase-shifting element 5 of length L acquires the y dependent phase shift $\Phi(y) = kNL + kL(dN/dy)y$, which corresponds to a deflection by an angle $\beta$, where $N\sin\beta = L(dN/dy) \approx L\Delta N/D$ with $\Delta N$ being the refractive index change over the width D of the guided wave. For example in the case where $N \approx 1,5$, $L = 10$ mm, $D = 1 - 0,1$ mm, and $\Delta N = 1 \cdot 10^{-3}$, we have $\beta \approx 0,4°$ to $4°$.

In the case where the distance d is quadratically dependent on the coordinate y, the effective refractive index of the guided wave 3 in waveguide section 1' is dependent on y in the following form: $N(y) = B + \frac{1}{2}(d^2N/dy^2)y^2$, where $d^2N/dy^2$ is a constant. The guided wave 3 experiences by its propagation under the phase-shifting element 5 of length L a y-dependent phase shift $\Phi(y) = kLN(y)$, which corresponds to the effect of a lens of focal length f on the guided wave 3d, where $1/f = N^{-1}L(d^2N/dy^2) \approx 4(\Delta N/N)(L/D^2)$ and $\Delta N$ is the maximum effective refractive index variation over the width D of the guided wave. For example in the case where $N = 1,5$, $\Delta N = 1,5 \cdot 10^{-3}$, $L = 10$ mm, and $D = 1$ mm, we have $f = 25$ mm.

Figure 10:
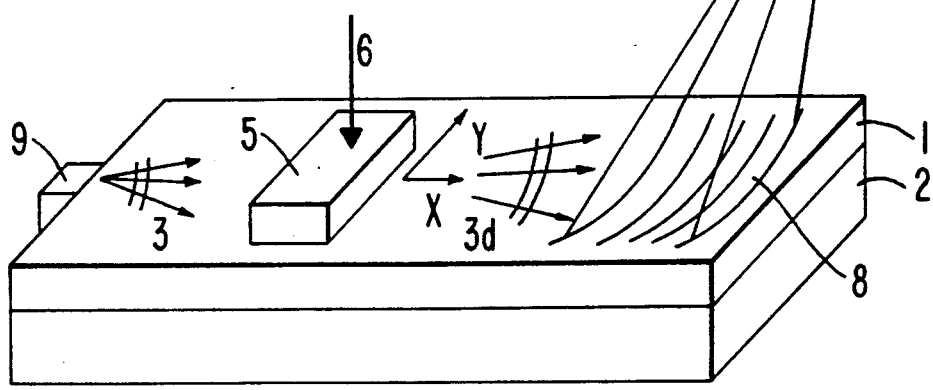

In FIG. 10 the method according to the present invention with two phase-shifting elements for laterally deflecting a wave which is outcoupled out of a waveguide in two orthogonal directions is schematically represented. The integrated optic circuit which is known as such consists of a planar waveguide 1 on a substrate 2 and a focusing grating coupler 8 with curved grating lines and spatially variable, i.e. non constant, grating period. Light from a laser 9 is coupled into a planar waveguide 1; the divergent guided wave 3 is coupled out by the grating coupler 8 and the outcoupled wave 3a is focused in the focus 11 on the surface 12. By the phase-shifting element 5 that is located at distance d opposite the section 1' of the planar waveguide 1 —as already schematically represented in FIG. 9—the guided wave 3d is deflected transversally to its direction of propagation and hence the focus 11 on the surface 12 is displaced in the y direction. By a second phase-shifting element (not shown) opposite to the grating coupler 8—as already explained in connection with FIG. 8—the outcoupling angle $\alpha$ of the outcoupled wave 3a is changed and thus the focus 11 on the surface 12 is displaced in the x direction. The method according to the present invention represents a laser scanner method which, for example, can be applied in digital optical data storage. The apparatus according to the present invention can be used as a pickup head for reading and/or writing. With the method according to the present invention the small corrections needed for tracking of the position of the focus 11 on the optical disc 12 can be performed very fast. This has the advantage, that not the whole read and/or write pickup head has to be quickly moved mechanically, which simplifies the mechanical construction very considerably. If only one displacement perpendicular to the track is required, the second phase-shifting element preferably that above the grating coupler 8 can be omitted.

Not shown is the possibility, that the wave 3a is reflected by the optical disc 12 nearly perpendicularly, and that the reflected wave is coupled back into the waveguide 1 by the grating coupler 8 and that the incoupled guided wave is focused by the grating on detectors which preferably are attached to the substrate.

Figure 11:
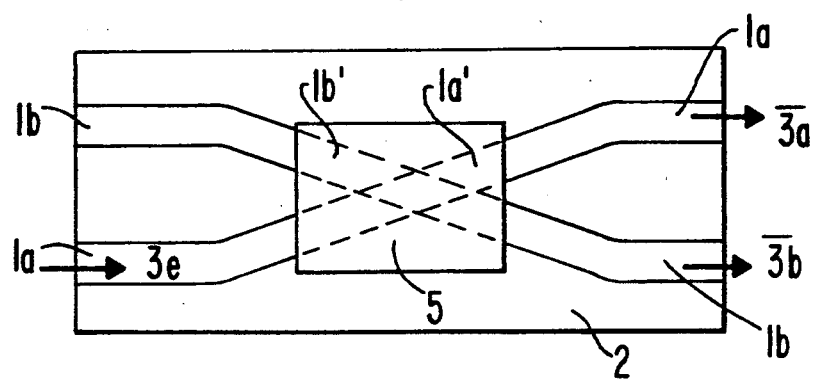

In FIG. 11 the method with an X-switch as integrated optic circuit is schematically represented. The X-switch consists of two strip waveguides 1a and 1b which cross either through or over each other under a small intersection angle, for example $1^0$. An optical wave 3e is coupled into one of the strip waveguides 1a or 1b. The phase-shifting element 5 is separated by a gap 4 (not represented in the top view) at a distance d opposite the cross-over region of the two waveguide sections 1a' and 1b'. In the case where the distance d in direction perpendicular to the two waveguide sections 1a' and 1b' has the form of a wedge, for a change in wedge angle the effective refractive indices N in the two strip waveguides sections la, and lb, are changed differently whereby the coupling between the two waveguides is changed. Thereby the intensities of the guided waves 3a and $\overline{3b}$ in the strip waveguides 1a and 1b at the output ports of the X-switch are changed. The X-switch, like the directional coupler, is a 2×2 switch matrix which can be switched from the cross state to the parallel state.

Figure 12:
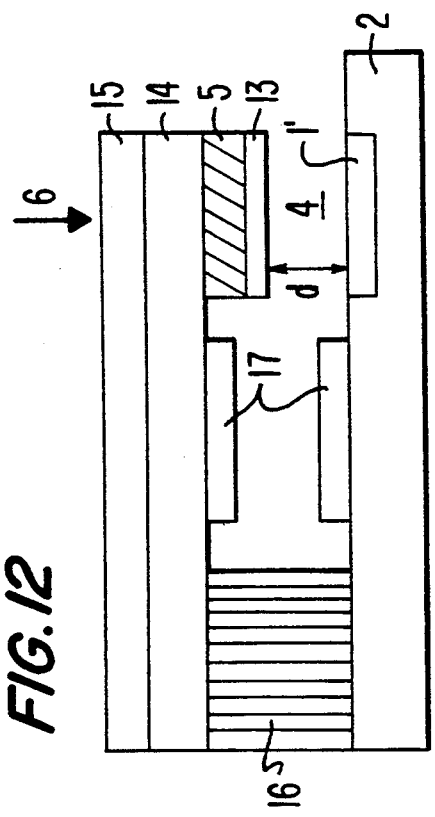

The apparatus according to the present invention which is represented schematically in FIG. 12, consists of a waveguide 1 on substrate 2, and a phase-shifting element 5 attached to a miniaturized tongue or paddle 14 with a surface layer 13 facing the waveguide section 1'. The tongue or paddle 14 is with its attachment 16 attached to the substrate 2. Between the phase-shifting element 5, or its surface layer 13, respectively, and the waveguide section 1' at distance d the gap 4 is provided, which is filled with air or another gas or which is evacuated. Therefore by a very small force 6 the tongue or paddle 14 can be bent and thus the distance d between the phase-shifting element 5 and the waveguide section 1' is varied. With the method according to the present invention from the measured phase shift of the guided wave 3 the distance change $\Delta d$ and hence the voltage between the electrodes 17 can be determined. The force 6 is, for example, an electrostatic attractive or repulsive force between the electrodes 17 that are arranged at the substrate 2 and at the tongue 14, and between which a voltage difference is applied. The force 6 can also be a mechanical force exerted on the tongue 14, or the acceleration force which acts on the tongue 14 with the phase-shifting element 5 if the whole apparatus according to the invention is accelerated. In the latter case the layer 15 consists preferably of metal, for example of Al or Au, to increase the inertial mass. The force 6 can also be produced by a temperature change through thermal expansion of one or several components out of the group consisting of waveguide 1, substrate 2, phase-shifting element 5, and its attachment 16 at the waveguide 1 or substrate 2. For example the layer 15 arranged on the tongue 14 can have a thermal expansion coefficient different to that of the tongue 14, which in case of a temperature change leads to a bending of the tongue 14 and hence to a distance change $\Delta d$. The tongue 14 can for example consist of $SiO_2$ and the layer 15 of metal. The temperature change can, for example, also be produced either by incident light or thermal infrared radiation, which is absorbed in the layer 15, the tongue 14, the phase-shifting element 5, the waveguide section 1', or the substrate 2, or by absorption of the guided wave 3 itself in the waveguide section 1' or in the phase-shifting element 5. In the latter case the behavior of the apparatus according to the invention becomes nonlinear, i.e. dependent of the power of the guided wave 3. The force 6 can also be produced piezoelectrically, for example, the layer 15 can be piezoelectric and change its length if a voltage is applied, whereby the tongue 14 is bent and the distance d changed.

The apparatus according to the present invention waveguide 1 which is arranged on a substrate 2 and has a protection layer 10 and a phase-shifting element 5 above waveguide section 1'. Between waveguide 1 and substrate 2 a buffer layer 7 (not shown) can lie, which must have a refractive index smaller than that of the waveguide 1. Said buffer layer 7 has the purpose to optically separate the waveguide 1 from the substrate 2 so that the latter can also be absorbing. The protection layer 10 has the purpose to prevent an undesirable influence from outside on the guided wave 3 in the waveguide 1; it has a refractive index smaller than that of the waveguide 1 and a thickness which is larger than the penetration depth of the evanescent field of the guided wave 3 into the protection layer 10. In the protection layer 10 above the waveguide section 1' a cavity is located, which defines as the gap 4 the distance d between waveguide section 1' and the phase-shifting element 5. The phase-shifting element 5 can for example be that region of the protection layer 10 immediately adjacent to the gap 4. The remaining part of the protection layer 10 above the cavity has the form of a miniaturized bridge or membrane over waveguide section 1'. By a small force 6 this bridge or membrane can be deformed and thus the distance d can be varied. The force 6 can for example be exerted by pneumatic or hydrostatic pressures or by sound or ultrasonic waves. Therefore the apparatus according to the present invention can, for example, be applied for the measurement of pressures or pressure changes, or as a microphone or hydrophone.

Figure 13:
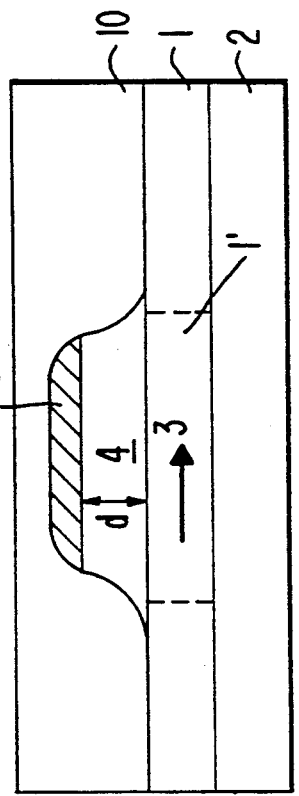
Figure 14:
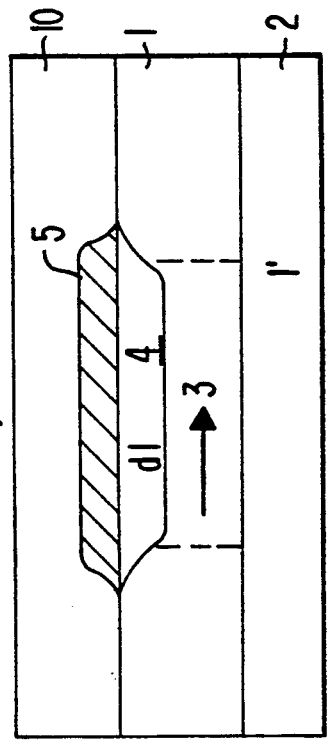

The apparatus according to the present invention which is represented schematically in FIG. 14, differs from that represented in FIG. 13, in that the cavity acting as the gap 4 is located in the waveguide section 1' itself, namely immediately at the interface to the protection layer 10. A region of the protection layer 10 which is immediately adjacent to the gap 4 acts as the phase-shifting element 5. Not represented is the further possibility, that the cavity in waveguide section 1' is located at the interface to the buffer layer 7 (not shown), and if the latter is not existing, respectively, at the interface to the substrate 2. The cavity then defines as the gap 4 the distance d between the waveguide section 1' and the phase-shifting element 5, as which act the regions of the buffer layer 7 immediately adjacent to the gap 4, or if the buffer layer is not present, of the substrate 2.

Figure 15:
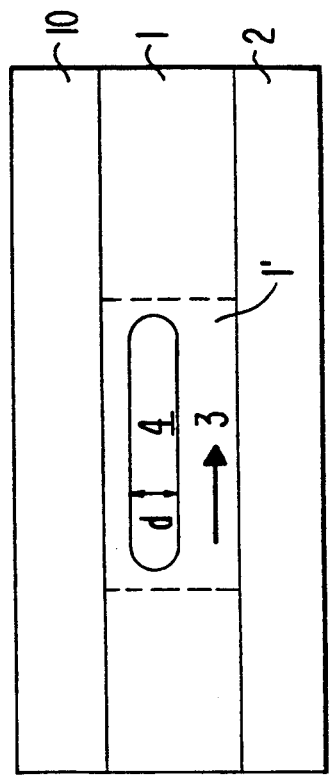

The apparatus according to the present invention which is represented schematically in FIG. 15 differs from that represented in FIG. 14 in that, the cavity serving as the gap 4 is located inside the waveguide section 1' itself. The two regions of waveguide section 1' which are immediately adjacent to the gap 4 and which are separated by it, both act at the same time as a phase-shifting element 5 and as a waveguide. Not represented is the further possibility, that two films each applied on a substrate (each of said films alone being either waveguiding or because of its small thickness not waveguiding) which have a refractive index greater than that of the respective substrate, are separated from each other only in a section 1' with spacers of thickness d which define the gap 4 between them, and outside of section 1' are combined with each other and form the waveguide 1, for example, are a single one-layer waveguide. In section 1' the two layers separated by the gap 4 act simultaneously as waveguides and as phase-shifting element 5.

The apparatus according to the present invention which is represented schematically in FIG. 16, comprises a waveguide 1 on a substrate 2 and a phase-shifting element 5 located at distance d above a waveguide section 1'. The phase-shifting element 5 is arranged at a piezoelectric element, which consists of the piezoelectric layer 18 and electrodes 17. The piezoelectric element itself is with an attachment 16 attached to the substrate 2. By applying a voltage to the electrodes 17, by the thus generated piezoelectric forces (which are not represented in the FIG.) the thickness of the piezoelectric layers 18, and consequently the distance d are changed, and thereby the phase of the guided wave 3 in waveguide section 1'. A further possibility to produce a distance change $\Delta d$ is by a temperature change through thermal expansion of one or more components out of the group consisting of waveguide 1, substrate 2, phase-shifting element 5, and its holder 16 to the substrate 2. The temperature change can be produced by electric currents in a thin film heater preferably made of indium-tin-oxide (ITO) or metal, or by a thermoelectric (Peltier) element, which replaces the layer 18, by applying a voltages to the electrodes 17. Not represented is the possibility to locate the layer 18, a thin film heater or a thermoelectric layer and the electrodes 17, not at the phase-shifting element 5 but—with buffer layers—between waveguide section 1' and substrate 2 or at the substrate 2.

In FIG. 17 the method according to the present invention is represented schematically with a fiber as the waveguide. The fiber consists of the fiber core 21 and the cladding 22. The optical wave 3, which is not represented in the cross-sectional drawing is guided in the core 21, analogously as in a strip waveguide 1 in integrated optics. The fiber core 21 is therefore called waveguide 1. The field of the guided wave penetrates into the cladding 22 in the form of an evanescent wave, the field strength of which decreases approximately exponentially with increasing distance from the fiber core 21. In a section 1' of the fiber waveguide 1, the cladding 22 is completely or partially removed on one side of the fiber as shown. Therefore the evanescent field of the guided wave 3 can interact through the gap 4 with the phase-shifting element 5 separated from the fiber by the distance d. By a variation of the distance d the effective refractive index N and hence the phase of the guided wave 3 guided in section 1' of the fiber waveguide, i.e., in the fiber core 21, are changed, completely analogous to the method according to the invention with a planar or strip waveguide. To hold the fiber it can be laid into a groove 23 in substrate 2, wherein preferably the substrate is a silicon wafer, into which the groove 23 has been etched. The phase-shifting element 5 is with an attachment 16 and bridge 19 attached to the substrate 2. With a force 6 the distance d is changed and thus the phase of the guided wave 3 in waveguide section 1'. The change in distance d can also be produced by the forces of an acoustic surface wave, which for example propagates on the surface of the bridge 19 facing waveguide section 1', which induce a displacement of the surface in direction of the normal.

In FIG. 18 the method according to the present invention with a Mach-Zehnder interferometer as fiber optic circuit is represented schematically. The interferometer which is known according to prior art is formed by the fiber waveguides 1a and 1b, which at the input side and output end of the interferometer are coupled with each other by 3dB-couplers 24 and 25. An incident guided wave 3e in waveguide 1a is by the 3dB-coupler 24 divided into the waves 3a and 3b in the two legs of the interferometer. The intensities of the waves $\overline{3a}$ and $\overline{3b}$, which occur at the output ports of the interferometer after the 3dB-coupler 25 in the fiber waveguides 1a and 1b, are proportional to $\sin^2[(\Phi_a-\Phi_b)/2]$ and $\cos^2[(\Phi_a-\Phi_b)/2]$, respectively, where $\Phi_a-\Phi_b$ is the phase difference of the waves 3a and 3b directly before the coupler 25. In the method according to the present invention a phase-shifting element 5 is located opposite a section 1a' of the waveguide 1a and separated from it by a gap 4, which is not shown. If the distance d—not shown in the top view—between the phase-shifting element 5 and the fiber waveguide 1a' is varied, the effective refractive index N of the partial wave 3a and hence its phase and therefore the phase difference $\Phi_a-\Phi_b$ are changed. With a distance change $\Delta d$ an intensity modulation of the waves $\overline{3a}$ and $\overline{3b}$ at the output ports of the interferometer is produced. If the distance d is chosen in such a way that the phase difference is $\Phi_a-\Phi_b=2\pi m$ and $\Phi_a-\Phi_b=\pi(2m+1)$ respectively, where m is an integer, then the wave 3e is switched from the input port 1a to the output port 1b or the output port 1a, respectively. In the case where another wave is incident at input port 1b, it is interconnected with the corresponding other one of the two output ports 1a or 1b respectively. With the method according to the present invention the Mach-Zehnder interferometer acts as a 2×2 switch matrix, which by a distance change $\Delta d$ inducing a change in phase difference $\Phi_a-\Phi_b$ by $\pi$, is switched from the parallel state, in which the input port 1a is optically interconnected only with the output port 1a and the input port 1b only with the output port 1b, into the cross state, in which the input port 1a is optically interconnected only with the output port 1b and the input port 1b only with the output port 1a. The described method according to the invention can be realized also with an integrated optic instead of the fiber optic Mach-Zehnder interferometer. In case of the integrated optic Mach-Zehnder interferometer also 3dB-couplers have to be used as beam splitter and beam combiner instead of the Y-junctions as in the Mach-Zehnder interferometer shown in FIG.3. Not shown is the further possibility to optically interconnect each of M input waveguides with one of M' output waveguides with matrix arrays of Mach-Zehnder interferometers with the method according to the present invention with at least one phase-shifting element in each Mach-Zehnder interferometer; the apparatus according to the present invention acts then as an $M \times M'$ switching matrix, where M and M, are integers $>2$.

The apparatus according to the present invention as schematically represented in FIG. 19, comprises a fiber waveguide with the fiber core 21 and the cladding 22 with a cavity preferably in the form of a slits, holes, or bores, in the cladding 22, which acting as the gap 4 defines the distance d between the fiber core 21 as waveguide section 1' and the phase-shifting element 5. The phase-shifting element 5 is here preferably the region of the cladding 22 adjacent to the gap 4. By a force 6 the distance d is varied and hence the effective refractive index N and thus the phase of the guided wave 3 (not shown) guided in waveguide section 1'.

Not shown is the further possibility that the cavity is completely or partially located in the fiber core 21, where it for example can also have the form of a cylindrical borehole along the axis of the fiber, which means that in that case the fiber is hollow in the section 1'. The cavities can be fabricated, for example as bores, holes, or slits, for example with pulsed lasers, e.g. with Nd-YAG-or excimer lasers, in glass or polymer fibers.

The method according to the invention is for example particularly well suited for the following applications:

1) in optical communication technology for directional switching, i.e., for switching of guided waves between various output ports in integrated optic circuits, and for phase and intensity modulation, 2) in the field of measurement techniques for measuring very small displacements with a resolution in the nm and sub-nm range, and very small forces and pressures and pressure changes, including sound pressure (as microphones and hydrophones), and of accelerations and vibrations.

I claim:

1. A method for changing the phase of guided waves and measuring very small mechanical displacements comprising the steps of
   providing a waveguide (1) having a first waveguide section (1') with an effective refractive index N and a phase shifting element (5) spaced from the waveguide section (1') by a gap (4) having a width d, filling the gap (4) with a medium having small absorption and a refractive index n<N, and either
   (a) varying the width d of the gap as a function of time while passing an optical wave (3) through the waveguide, the width d of the gap being sufficiently small so that the refractive index of the waveguide and the phase of the wave ar changed by interation of the evanescent field of the wave with phase-shifting element 3 or surface layers (13) of phase shifting element (5) facing the waveguide section (1'), while absorbing or coupling out of the waveguide section (1') substantially no power of the guided wave (3) by the phase shifting element (5), or
   (b) measuring changes of the effective refractive index N and the phase of the optical wave (3) as a measure of changes of the width d.

2. A method according to claim 1 wherein the width d between the waveguide section (1') and the phase-shifting element (5) is smaller than four times the penetration depth $\Delta z=(\lambda/2\pi)(N^2-n^2)^{-\frac{1}{2}}$ of the evanescent field into the gap (4), where $\lambda$ is the wavelength in vacuum.

3. A method according to claim 2 wherein the gap (4) between the section (1') of the waveguide (1) and the phase-shifting element (5) is filled with a compressible medium or is evacuated.

4. Method according to claim 3, characterized in that the change of width d between the phase-shifting element (5) and the section (1') of the waveguide (1) is produced by a force (6) or several forces, preferably by mechanical forces, and/or pneumatic or hydrostatic pressures, or by pressures of sound or ultrasonic waves, and/or acceleration forces, and/or by electrostatically, electromagnetically, or piezoelectrically generated forces, or by forces exerted by acoustic surface waves.

5. Method according to claim 3, characterized in that the change in width d between the phase-shifting element (5) and the section (1') of the waveguide (1) is produced through thermal expansion or deformation of one, some, or all components chosen from the group consisting of waveguide (1), substrate (2), phase-shifting element (5) and its attachment (16;16,14,15;16,19) to the waveguide (1) or substrate (2), by temperature changes, which in particular are caused either by electric currents in an electrically conducting heating layer, consisting for example, of indium-tin-oxide (ITO), or in a thermo-electric element, which are attached to the substrat (2), the phase-shifting element (5), or the attachment (16;16,14,15;16,19), or by absorption of light or infrared radiation in waveguide section (1') or in the phase-shifting element (5), wherein either the light or infrared radiation is incident from outside or the guided optical wave (3) itself is partially absorbed.

6. Method according to claim 5, characterized in that the waveguide (1) has the form of a planar or strip waveguide on a substrate (2).

7. Method according to claim 5, characterized in that the waveguide (1) has the form of the core (21) of a fiber waveguide, the fiber cladding (22) of which is in the waveguide section (1') completely or partially removed, preferably one side of the fiber only.

8. Method according to claim 7, characterized in that an optical wave (3e) is coupled into a waveguide (1) and is guided therein, and is incident on an integrated optic or fiber optic interferometer, preferably a Mach-Zehnder interferometer or Michelson interferometer, and that the distance d between a section (1a') of the waveguide (1a) in one leg of the interferometer and the phase-shifting element (5) located opposite to said section (1a') is varied, whereby the phase of the guided wave (3a) in waveguide section (1a') and hence the intensities of the guided waves (3c;3a,3b) at the output ports of the interferometer are changed, and that either the width d is varied as a function of time and thus a desired intensity modulation is impressed on the waves (3c;3a,3b), or that by the effect of forces (6) or temperature changes induced unknown changes of the width d are determined from the intensity changes of one of the waves (3c;3a,3b).

9. Method according to claim 7, characterized in that an optical wave (3e) is coupled into and is guided in one of two strip waveguides (1a,1b) which form a directional coupler, and that the width d between section (1a') of the waveguide (1a) in the coupling region and the phase-shifting element (5) located opposite to it is varied, and hence the intensities of the guided waves (3a,3b) in the two waveguides (1a,1b) at the output ports are changed, or the guided wave (3e) is switched from the one to the other output waveguide (1a,1b) of the directional coupler.

10. Method according to claim 7, characterized in that the width d is varied between a section (1') of an optical waveguide (1) inside of an integrated optic or fiber optic resonator, preferably a Fabry-Perot resonator or ring resonator, and a phase-shifting element (5) which is located opposite said section (1'), and thereby the resonance frequencies of the resonator and its transmittance and reflectance are changed, and that either a guided optical wave (3e) is incident on the resonator and the intensities of the reflected (3r) and transmitted waves (3t) are changed, or that the wavelengths are changed of the guided waves generated by amplification in an active medium inside the resonator.

11. Method according to claim 7, characterized in that a wave (3) guided in an optical waveguide (1) impinges on a grating, (8) which acts as a Bragg reflector, and that the width d between the waveguide (1) and a phase-shifting element (5) located opposite to said waveguide in the region of the grating (8) is varied, whereby the wavelength for which optimum Bragg reflection occurs and the reflectance and transmittance of the Bragg reflector are changed and hence the intensities of the transmitted (3t) and reflected (3r) guided waves dependent on their frequencies are changed, or that guided waves (3) are generated in the region of the grating (8) in a waveguide 1 with amplification, i.e., in a so called DFB (distributed feedback) laser, whereby their wavelengths, i.e. the emission frequencies of the DFB lasers are changed.

12. Method according to claim 7, characterized in that an optical wave (3e) is by a grating coupler (8) coupled into a waveguide (1) and that the distance d between the waveguide section (1') and a phase-shifting element (5) which is located opposite to said section (1') in the region of the grating coupler (8) is varied, whereby the intensity of the incoupled guided wave (3) and hence the intensity of the non-incoupled part of the incident optical wave (3e) are changed.

13. Method according to claim 7, characterized in that an optical wave (3) guided in a waveguide (1) is outcoupled by a grating coupler (8) and that the width d between the waveguide section (1') and a phase-shifting element (5), which is located opposite to said section (1') in the region of the grating coupler (8), is varied uniformly and/or like a wedge in direction of propagation of the guided wave (3), whereby the direction and/or focusing of the outcoupled beam (3a) are changed.

14. Method according to claim 7, characterized in that an optical wave (3) is guided in a planar waveguide (1) and that the Δdistance d between a section (1') of the waveguide (1) and a phase-shifting element (5), which is located opposite to said section (1'), is formed like a wedge transverse to the direction of propagation of the guided wave (3) and that the wedge angle is varied, whereby the guided wave (3) is deflected and the deflection angle ($\beta$) of the deflected wave (3d) after the phase-shifting element (5) is changed, and/or has the form of a quadratic curve, the curvature of which is varied, whereby the guided wave (3d) after the phase-shifting element (5) is focused or defocused and the focusing is changed.

15. Method according to claim 14, characterized in that light of a laser (9) is coupled into a planar waveguide (1) on a substrate (2), and is incident divergently on a grating coupler (8) with curved grating lines and non-constant grating period and is outcoupled by it, whereby the outcoupled wave (3a) is focused to a focus (11), and that with a phase-shifting element (5) opposite the section (1') of the planar waveguide (1), and/or with a phase-shifting element (5) opposite the grating coupler (8) the focus (11) is displaced in one direction or two orthogonal directions, respectively.

16. Method according to claim 7, characterized in that a guided wave (3e) is coupled into one of two strip waveguides (1a,1b), which intersect under a small angle and thus form an X-switch, and that the width d between the waveguide sections (1a',1b') in their crossover region and a phase-shifting element (5) located oppositely is changed, preferably in such a way that a in direction perpendicular to the two strip waveguides a wedge like gap (4) is formed between the phase-shifting element (5) and the waveguide sections (1a',1b') and the substrate surface, respectively, and the wedge angle is changed, whereby the wave (3e) at the output of the X-switch is switched from one strip waveguide (1a) to the other strip waveguide (1b), or the intensities of the guided waves (3a) and (3b) at the output ports are modulated, respectively.

17. Method according to claim 16, characterized in that in an integrated optic or fiber optic Mach-Zehnder interferometer, directional coupler, or X-switch, which as 2×2 switch matrices optically interconnect two input waveguides (1a) and (1b) with two output waveguides (1a) and (1b), the distance d between the phase-shifting element (5) and the waveguide sections (1a';1a',1b') is adjusted in such a way, that either the input waveguide (1a) is optically interconnected only with the output waveguide (1a) and simultaneously the input waveguide (1b) only with the output waveguide (1b), or the input waveguide (1a) is optically interconnected only with the output waveguide (1b) and simultaneously the input waveguide (1b) only with the output waveguide (1a), and that by a change of the width d the switch matrix can be switched from the first mentioned parallel state into the last mentioned cross state.

18. Method according to claim 17, characterized in that in M×M' switch matrices which are formed by arrays of directional couplers, Mach-Zehnder interferometers, or X-switches, which serve as 2×2 switch matrices and which each contain at least one phase-shifting element (5), the width d of the phase-shifting elements (5) from the corresponding waveguide sections (1a';1a',1b') in the 2×2 switch matrices are adjusted in such a way, that each of M input waveguides is optically interconnected as desired with one or several of M' output waveguides, where M and M' are integers >2.

19. An apparatus comprises an optical waveguide (1) or an integrated optic or fiber optic circuit, which contains at least one optical waveguide, and a phase-shifting element (5) located at a small variable width d opposite section (1') of the waveguide (1) and separated by a gap (4) from said section.

20. Apparatus according to claim 19, characterized in that the phase-shifting element (5) or its surface layers (13) facing the waveguide section (1') consist of materials which absorb no or little light at the used wavelength λ and have refractive indices $n_E$ smaller than the effective refractive index N of the wave (3) guided in the waveguide section (1').

21. Apparatus according to claim 20, characterized in that the surface of the phase-shifting element (5) or its surface layers (13), respectively, facing the waveguide section (1'), are either smooth or are provided with a surface structure, for example, with a grating (8) acting as an input or output coupler, or as a Bragg reflector.

22. Apparatus according to claim 21, characterized in that the phase-shifting element (5) opposite the waveguide section (1') is attached to a tongue or paddle (14), bridge (19), or membrane, which in turn with an attachment (16) is attached to the waveguide (1), a substrate (2), or a protection layer (10), wherein the tongue or paddle (14), bridge (19), or membrane preferably are miniaturized and for example consist of $SiO_2$, and are preferably covered with another layer (15), which for example has a different thermal expansion coefficient, or is a heating layer, a piezoelectric layer, or a metal layer.

23. Apparatus according to claim 22, characterized in that beneath the waveguide section (1'), in the substrate (2), or in the buffer layer (7) lying between waveguide (1) and substrate (2), a cavity is located as the gap (4) between the waveguide section (1') and the phase-shifting element (5), wherein preferably the phase-shifting element (5) is identical with that region of substrate (2) or buffer layer (7) adjacent to the gap (4), or that above the waveguide section (1') in the protection layer (10) on the waveguide (1) a cavity is provided as the gap (4) between the waveguide section (1') and the phase-shifting element (5), wherein preferably the phase-shifting element (5) is identical with that region of the protection layer (10) adjacent to the gap (4), or that in the case of a fiber waveguide in section (1') in the cladding (22) a cavity is provided as the gap (40 between fiber core (21) and the phase-shifting element (5), wherein preferably the phase-shifting element (5) is identical with the region of the cladding (22) adjacent to the gap (4).

24. Apparatus according to claim 19, characterized in that a cavity is provided as the gap (4) inside the waveguide section (1') and the regions of the waveguide section (1') adjacent to the gap (4) act simultaneously as waveguide (1') and as phase-shifting element (5).

25. Apparatus according to claim 24, characterized in that cavities, for example in the form of slits, bores, or holes are provided as gap (4) in the waveguide section (1') a protection layer (10), the buffer layer (7), or a substrate (2), in fiber waveguides in the core (21) or in the cladding (22).

26. Apparatus according to claim 22, characterized in that the phase-shifting element (5) is attached to the substrate (2) with a holder (16;16,14,15;16,19).

27. Apparatus according to one of the claims 19 to 26, characterized in that the substrate (2) is a silicon wafer, the buffer layer (7) consists of $SiO_2$, and preferably the waveguide (1) consists of $Si_3N_4$ and the phase-shifting element (5) and the protection layer (10) of $SiO_2$.

28. A method according to claim 2 wherein the width d between the waveguide section (1') and the phase-shifting element (5) is smalle than one penetration depth Δz.

29. A method according to claim 3 wherein the compressible medium is a gas.

* * * * *